US009746950B2

United States Patent
Fukushima et al.

(10) Patent No.: US 9,746,950 B2
(45) Date of Patent: Aug. 29, 2017

(54) DISPLAY DEVICE INCLUDING A SENSOR, WITH REDUCING INFLUENCE OF PARASITIC CAPACITANCE ON THE SENSOR, AND METHOD OF DRIVING DISPLAY DEVICE

(71) Applicant: Japan Display, Inc., Minato-ku (JP)

(72) Inventors: Toshiaki Fukushima, Tokyo (JP); Koji Noguchi, Tokyo (JP); Hiroshi Mizuhashi, Tokyo (JP); Gen Koide, Tokyo (JP); Tadayoshi Katsuta, Toyko (JP)

(73) Assignee: Japan Display Inc., Minato-ku (JP)

( * ) Notice: Subject to any disclaimer, the term of this patent is extended or adjusted under 35 U.S.C. 154(b) by 56 days.

(21) Appl. No.: 14/729,515

(22) Filed: Jun. 3, 2015

(65) Prior Publication Data

US 2015/0355765 A1 Dec. 10, 2015

(30) Foreign Application Priority Data

Jun. 5, 2014 (JP) ................................ 2014-116726

(51) Int. Cl.
*G06F 3/041* (2006.01)
*G06F 3/044* (2006.01)
*G09G 3/36* (2006.01)

(52) U.S. Cl.
CPC ............ *G06F 3/0412* (2013.01); *G06F 3/044* (2013.01); *G06F 3/0416* (2013.01); *G09G 3/3655* (2013.01); *G09G 3/3666* (2013.01); *G09G 2300/0876* (2013.01); *G09G 2310/0286* (2013.01)

(58) Field of Classification Search
None
See application file for complete search history.

(56) References Cited

U.S. PATENT DOCUMENTS

| 2009/0256818 | A1 | 10/2009 | Noguchi et al. |
| 2010/0182273 | A1 | 7/2010 | Noguchi et al. |
| 2012/0013564 | A1* | 1/2012 | Westhues ................ G06F 3/044 345/174 |
| 2013/0093706 | A1* | 4/2013 | Kurasawa ............. G06F 3/0412 345/173 |

(Continued)

FOREIGN PATENT DOCUMENTS

| JP | 2009-244958 | 10/2009 |
| JP | 2009-258182 | 11/2009 |
| JP | 2014-199605 | 10/2014 |

*Primary Examiner* — David D Davis
(74) *Attorney, Agent, or Firm* — Oblon, McClelland, Maier & Neustadt, L.L.P.

(57) ABSTRACT

A display device includes a sensor, a display panel, and a plurality of electrodes for a touch sensor. The plurality of electrodes include drive electrodes and detection electrodes. The drive electrodes are also used as common electrodes for display, which are provided in the display panel. An image display operation of the display panel and a driving operation of the electrodes for the touch sensor are performed in a time sharing manner. In the driving operation of the electrodes for the touch sensor, a code division multiplexing (CDM) drive is performed in units of successive common electrodes, and a drive signal which synchronizes with the CDM drive is input to all common electrodes other than successive common electrodes subjected to the CDM drive.

4 Claims, 16 Drawing Sheets

(56) References Cited

U.S. PATENT DOCUMENTS

| | | | |
|---|---|---|---|
| 2013/0093722 A1* | 4/2013 | Noguchi | G06F 3/0412 345/174 |
| 2013/0328812 A1* | 12/2013 | Kim | G06F 3/044 345/173 |
| 2014/0146013 A1 | 5/2014 | Noguchi et al. | |
| 2014/0292709 A1* | 10/2014 | Mizuhashi | G06F 3/0416 345/174 |
| 2014/0292718 A1 | 10/2014 | Noguchi et al. | |
| 2015/0370401 A1* | 12/2015 | Mizuhashi | G02F 1/13338 345/174 |

\* cited by examiner

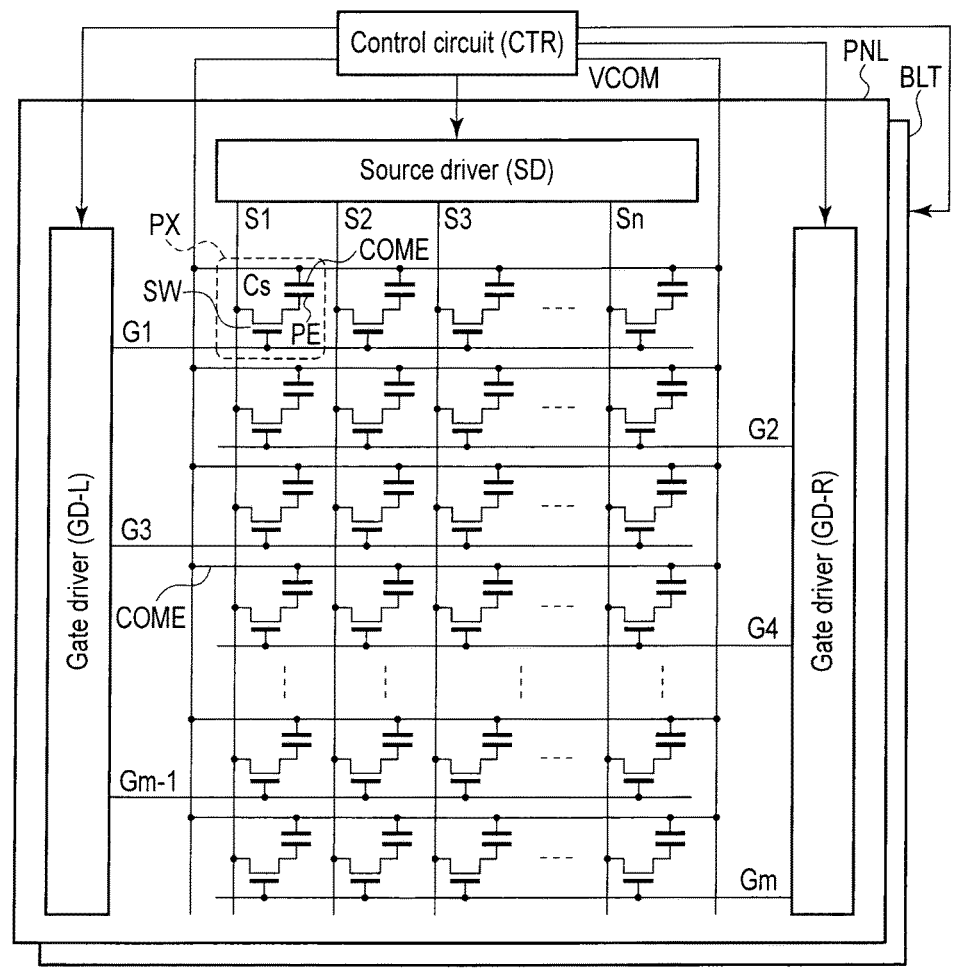
F I G. 1

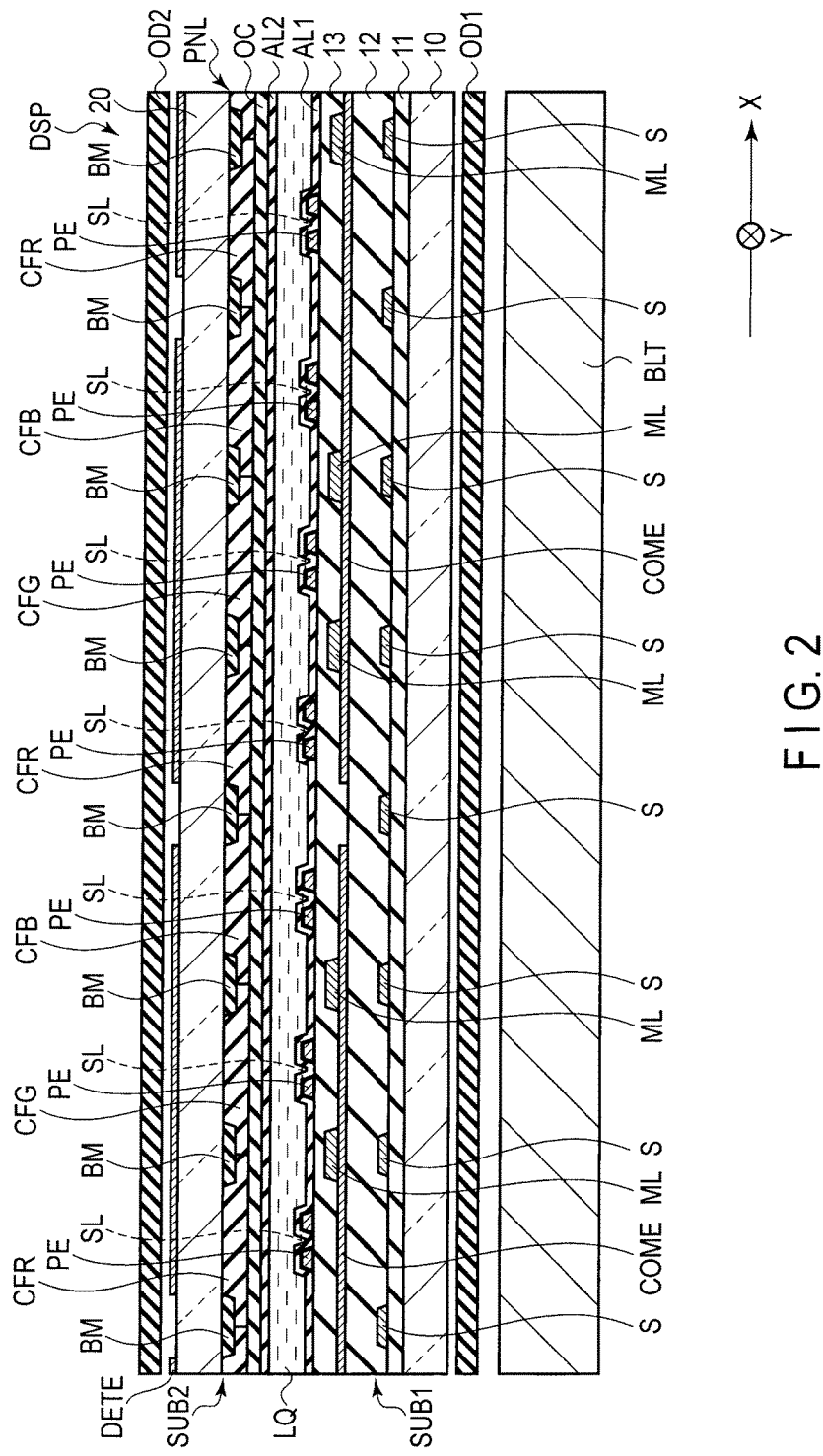
F I G. 2

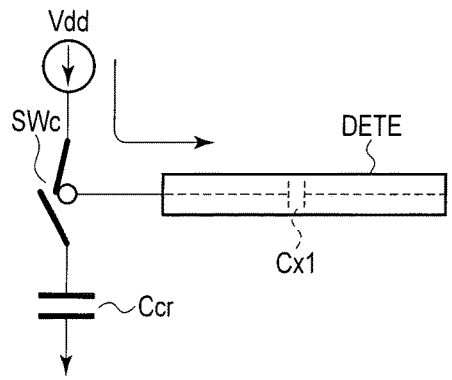 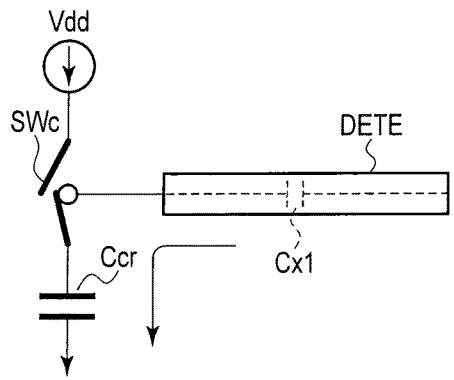
F I G. 3A          F I G. 3B
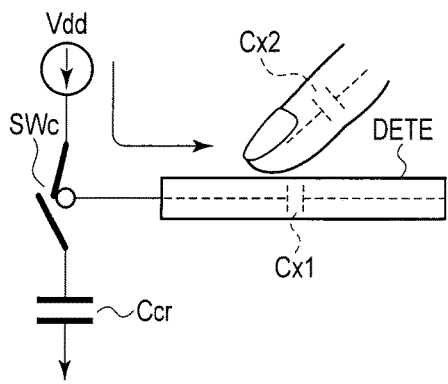 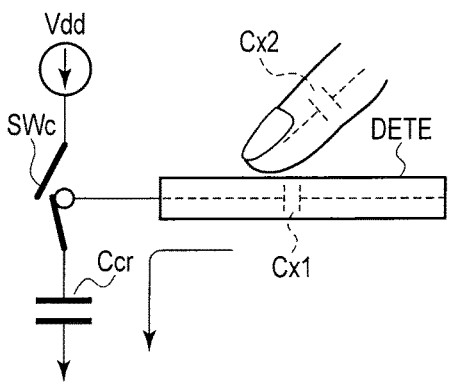
F I G. 4A          F I G. 4B

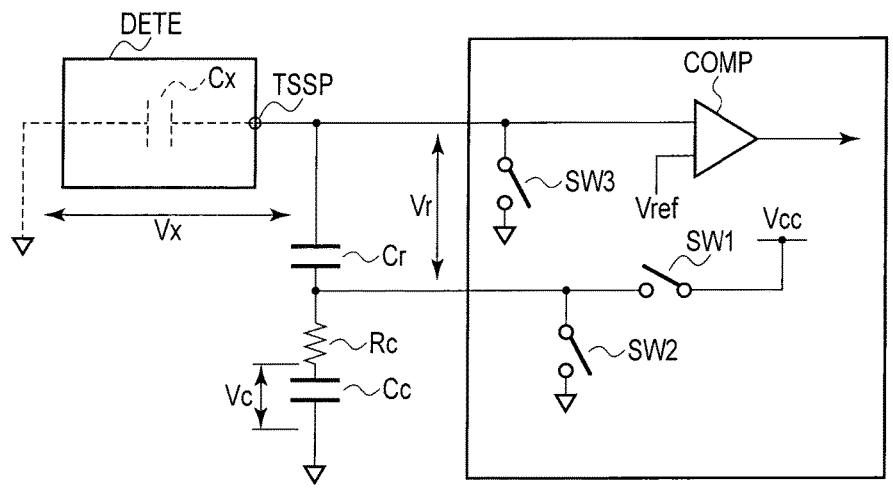
F I G. 5
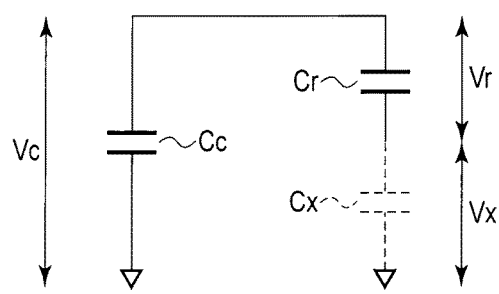
F I G. 6

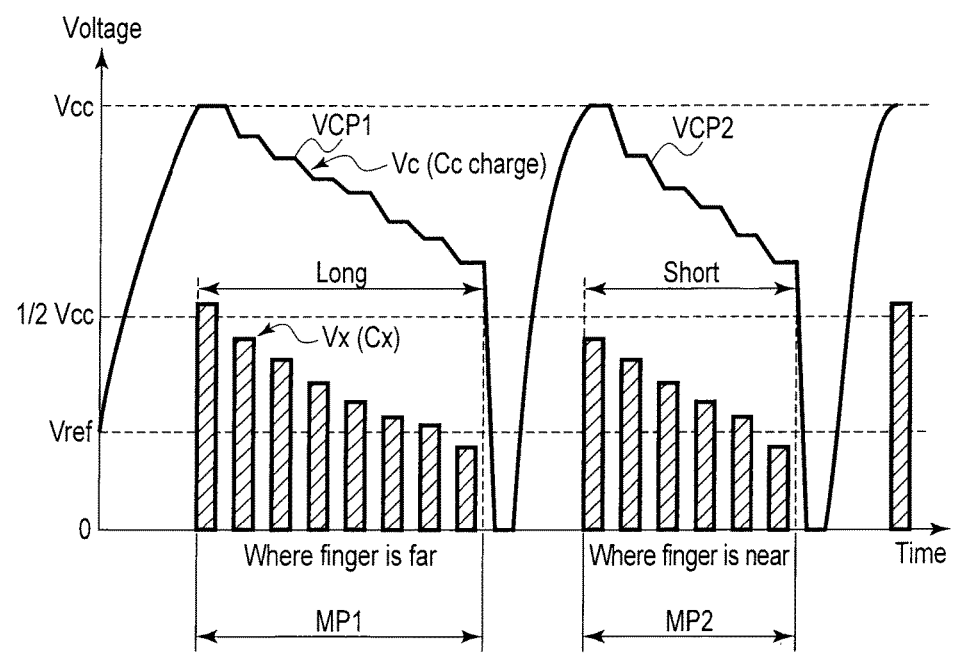
F I G. 7

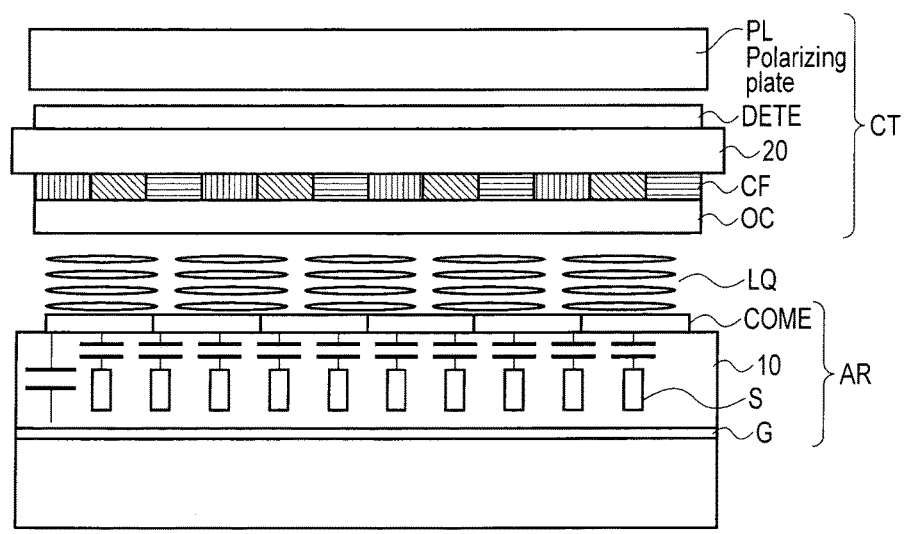
F I G. 11

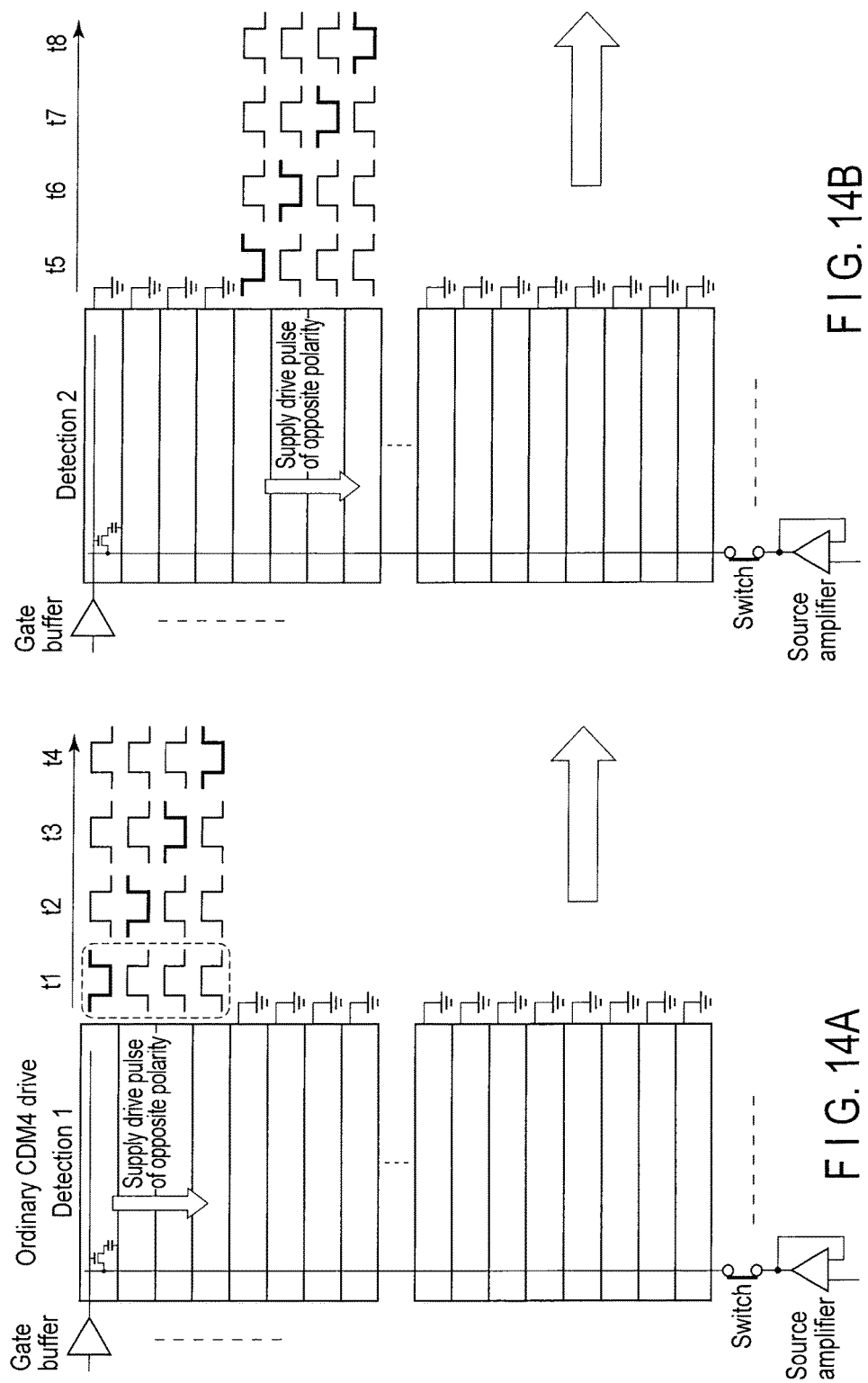

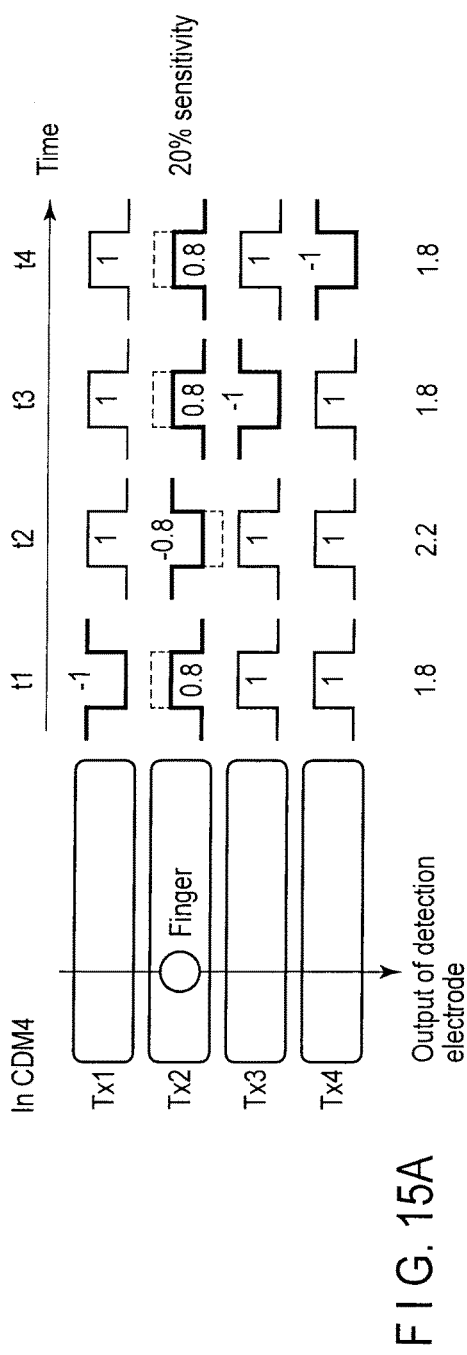
F I G. 15A
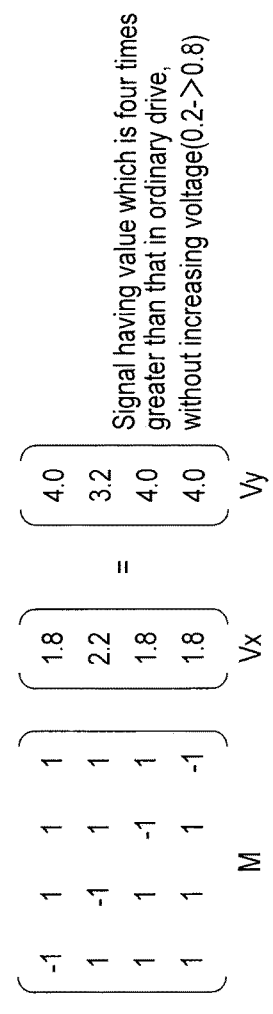
F I G. 15B

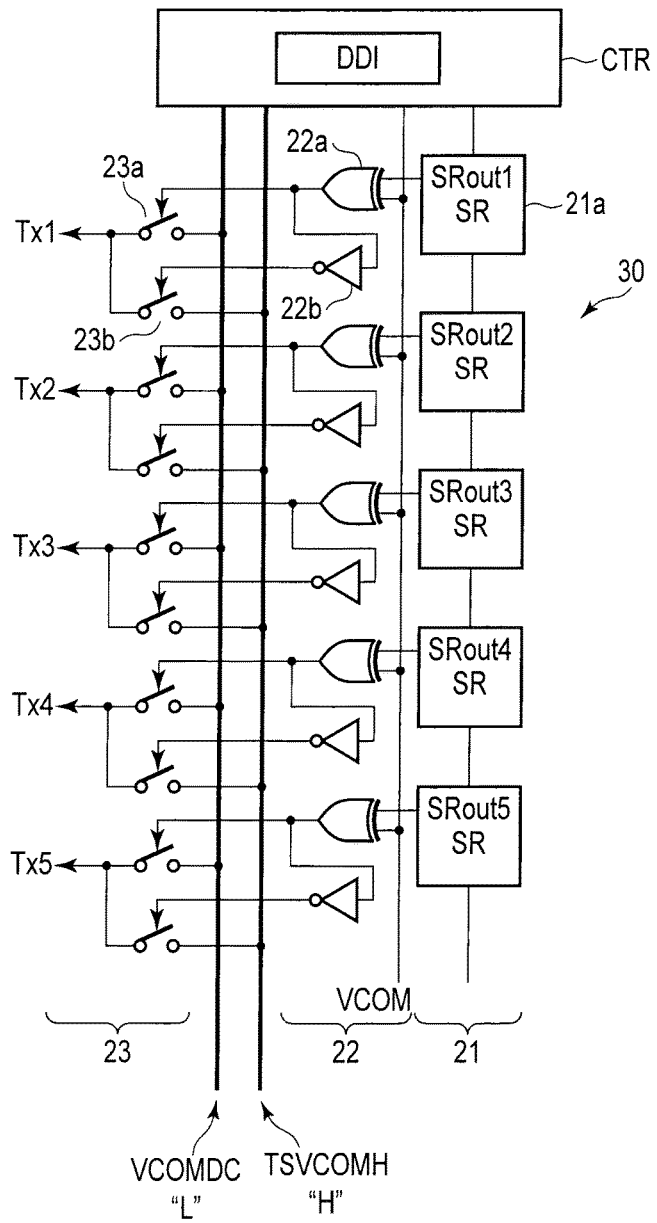
F I G. 17

DISPLAY DEVICE INCLUDING A SENSOR, WITH REDUCING INFLUENCE OF PARASITIC CAPACITANCE ON THE SENSOR, AND METHOD OF DRIVING DISPLAY DEVICE

CROSS-REFERENCE TO RELATED APPLICATIONS

This application is based upon and claims the benefit of priority from Japanese Patent Application No. 2014-116726, filed Jun. 5, 2014, the entire contents of which are incorporated herein by reference.

FIELD

Embodiments described herein relate generally to a display device provided with a sensor and a method of driving the display device.

BACKGROUND

In recent years, attention has been given to display devices in which a touch detection device referred to as a so-called touch panel is provided on a display device such as a liquid crystal display device, or a touch panel and a display device are integrated as a single body, and the display device is made to display various button images to enable information to be input without ordinary real buttons. Such display devices having a touch detection function do not need input devices such as a keyboard, a mouse and a keypad, and thus tend to be broadly used as display devices of computers, portable information terminals such as cell phones, etc.

As such a touch panel, a capacitive touch panel is known in which a plurality of electrodes each formed to extend in a single direction are intersected to each other. In this touch panel, the electrodes are connected to a control circuit, and when supplied with an excitation current from the control circuit, they detect an object close thereto.

As a display device provided with a touch sensor, a so-called in-cell touch panel is proposed in addition to a so-called on-cell touch panel in which a touch panel is provided on a display surface of a display device. In the in-cell display device, a common electrode for display, which is originally provided in the display device, is also used as one of a pair of electrodes for a touch sensor, and the other of the pair of electrodes (a touch detection electrode) is provided to intersect the common electrode.

Furthermore, as methods of detecting a touch position, a mutual detection method and a self-detection method are known. In the mutual detection method, a drive signal of alternating voltage is input to one of electrodes, and a detection signal generated in the other electrode by the drive signal is processed, to thereby detect a touch position. In the self-detection method, drive signals of alternating voltage are input to electrodes, respectively, and signals generated in the electrodes, respectively, are processed, to thereby detect a touch position.

Incidentally, in a display device provided with an in-cell touch sensor, if a common electrode for display which is provided in the display device is used as an electrode for the touch sensor, there is a possibility of a display being influenced by a parasitic capacitance generated between the common electrode and drive lines (source lines, gate lines, etc.). In recent years, the influence of the parasitic capacitance has been grown since display panels have been made to have a larger size and also a higher resolution. This can cause their display functions to be remarkably worsened.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view schematically showing a structure of a display device provided with a sensor, according to an embodiment;

FIG. 2 is a cross-sectional view showing in more detail the display device provided with the sensor, according to the embodiment;

FIG. 3A is a view for explaining a principle of a self-detection method in the display device provided with the sensor, according to the embodiment;

FIG. 3B is another view for explaining the principle of the self-detection method in the display device provided with the sensor, according to first embodiment;

FIG. 4A is still another view for explaining the principle of the self-detection method in the display device provided with the sensor according to the embodiment;

FIG. 4B is a further view for explaining the principle of the self-detection method in the display device provided with the sensor according to the embodiment;

FIG. 5 is a view showing an example of a basic circuit for achieving the self-detection method in the display device provided with the sensor according to the embodiment;

FIG. 6 is a view showing an equivalent circuit in the case where a switch of the display device provided with the sensor according to the embodiment is closed or opened;

FIG. 7 is a view for showing a variation waveform of a voltage of a capacitor and an output waveform of a comparator in the display device provided with the sensor according to the embodiment;

FIG. 11 is a view for explaining why the detection sensitivity of self-detection of the display device provided with the sensor according to the embodiment is reduced;

FIG. 14A is a view for explaining a Code Division Multiplexing (CDM) drive according to the embodiment;

FIG. 14B is another view for explaining the CDM drive according to the embodiment;

FIG. 15A is a view for explaining advantages of the CDM drive according to the embodiment;

FIG. 15B is another view for explaining the advantages of the CDM drive according to the embodiment;

FIG. 17 is a view for explaining a configuration of a touch drive circuit in the display device provided with the sensor according to the embodiment.

DETAILED DESCRIPTION

Figure 8:
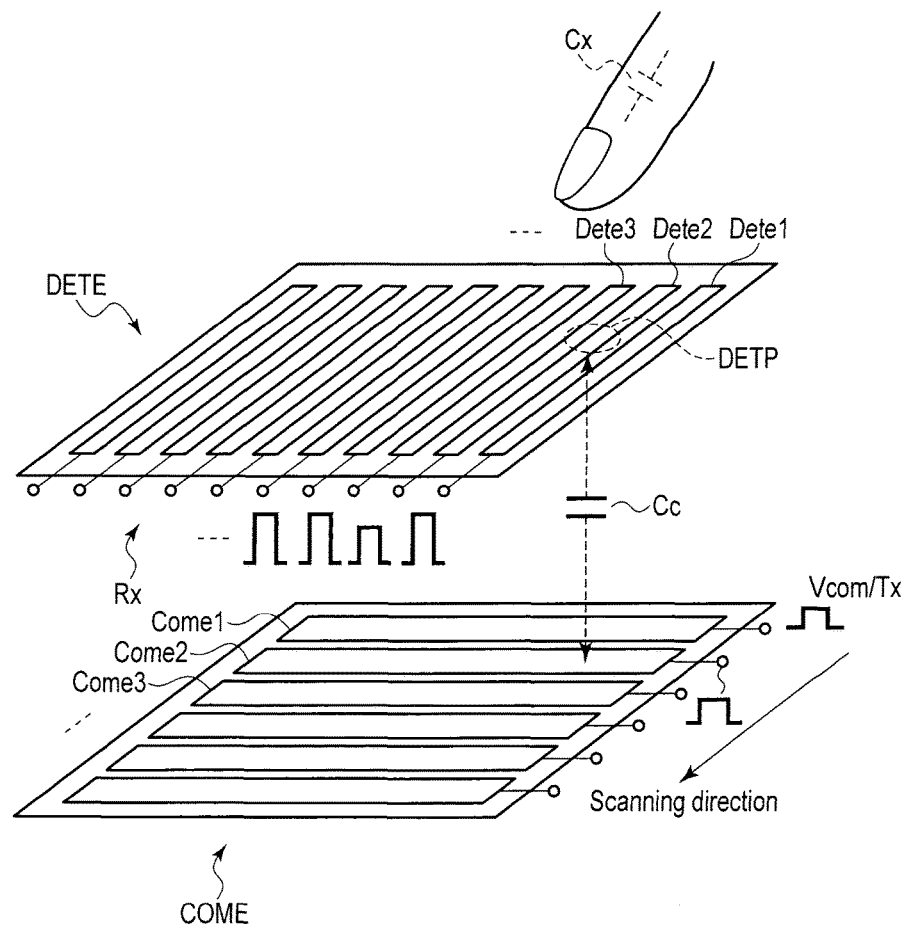
FIG. 8 is a view showing a representative basic structure of a mutual detection method of the display device provided with the sensor, according to the embodiment.

Various embodiments will be described hereinafter with reference to the accompanying drawings.

In general, according to one embodiment, a display device provided with a sensor, includes: a plurality of electrodes for a touch sensor, which comprise a plurality of drive electrodes arranged side by side to extend in a single direction, and a plurality of detection electrodes extending in a direction crossing the direction in which the drive electrodes extend, and provided to generate capacitances at intersections of the detection electrodes and the drive electrodes; and a display panel which includes a plurality of display elements arranged in a matrix, a plurality of gate lines extending along display elements arranged in a row direction, and a plurality of source lines extending along display elements arranged in a column direction, wherein a plurality of common electrodes for display which are provided in the display panel are also applied as the drive electrodes in the plurality of electrodes for the touch sensor, an image display operation of the display panel and a driving operation of the electrodes for the touch sensor are performed in a time sharing manner, and in the driving operation of the electrodes for the touch sensor, a code division multiplexing (CDM) drive is performed in units of successive common electrodes, and a drive signal which synchronizes with the CDM drive is input to all common electrodes other than successive common electrodes subjected to the CDM drive.

FIG. 1 is a view schematically showing a structure of a display device DSP provided with a sensor, according to an embodiment. It should be noted that in the embodiment, the display device is a liquid crystal display device.

The display device comprises a display panel PNL and a backlight BLT which illuminates the display panel PNL from a rear surface side thereof. The display panel PNL comprises a display portion including display pixels PX arranged in a matrix.

As shown in FIG. 1, the display portion comprises gate lines G (G1, G2, ... ), source lines S (S1, S2, ... ) and pixel switches SW, the gate lines G extending along display pixels PX arranged in a row direction, the source lines S extending along display pixels PX arranged in a column direction, and pixel switches PW close to intersections of the gate lines G and the source lines S.

The pixel switches SW comprise thin film transistors (TFTs). Gate electrodes of the pixel switches SW are electrically connected to associated gate lines G. Source electrodes of the pixel switches SW are electrically connected to associated source lines S. Drain electrodes of the switches S are electrically connected to associated pixel electrodes PE.

Furthermore, as drive means for driving the display pixels PX, gate drivers GD (left GD-L and right GD-R) and a source driver SD are provided. The gate lines G are electrically connected to output terminals of the gate drivers GD. The source lines S are electrically connected to output terminals of the source driver SD.

The gate drivers GD and the source driver SD are located in a peripheral area (frame edge) of the display area. The gate drivers GD successively applies on-voltages to the gate lines G, as a result of which the on-voltages are applied to the gate electrodes of pixel switches SW, which are electrically connected to selected gate lines G. To be more specific, when an on-voltage is applied to a gate electrode, electrical conduction is effected between a source electrode and a drain electrode of a pixel switch SW including the above gate electrode. On the other hand, the source driver SD supplies output signals to the source lines S, respectively. To be more specific, when an output signal is supplied to a source line S, it is also supplied, through the pixel switch SW in which electrical conduction is effected between its source and drain electrodes, to an associated pixel electrode PE.

Operations of the gate drivers GD and the source driver SD are controlled by a control circuit CTR provided outside the liquid crystal display panel PNL. Furthermore, the control circuit CTR applies a common voltage Vcom to a common electrode COME which will be described later, and also controls an operation of the backlight BLT.

FIG. 2 is a cross-sectional view showing in detail a structure of the display device DSP provided with the sensor according to the embodiment.

The display device DSP provided with the sensor comprises the display panel PNL, the backlight BLT, a first optical element OD1 and a second optical element OD2. In an example shown in the figure, the display panel PNL is a liquid crystal display panel; however, as the display panel PNL, another flat panel such as an organic electroluminescence display panel may be applied. Also, the display panel PNL as shown in the figure has a structure compliant with a lateral electric-field mode applied as a display mode, but may have a structure compliant with other display modes.

The display panel PNL comprises a first substrate SUB1, a second substrate SUB2 and a liquid crystal layer LQ. The first substrate SUB1 and the second substrate SUB2 are stacked together, with a gap provided between them. The liquid crystal layer LQ is held in the gap between the first substrate SUB1 and the second substrate SUB2.

The first substrate SUB1 is formed of a first insulating substrate 10 having a light transmittance characteristic, such as a glass substrate or a resin material. On a side of the first insulating substrate 10 which is located opposite to the second substrate SUB2, the first substrate SUB1 comprises the source lines S, the common electrode COME, the pixel electrodes PE, a first insulating film 11, a second insulating film 12, a third insulating film 13, a first alignment film AL1, etc.

The pixel electrodes PE and the common electrode COME form, along with a pixel area of the liquid crystal layer located between those electrodes, display pixels, which are arranged in the display panel PNL.

The first insulating film 11 is provided on the first insulating substrate 10. It should be noted that although it will not be explained in detail, between the first insulating substrate 10 and the first insulating film 11, the gate lines G, gate electrodes of switching elements, a semiconductor layer, etc., are provided. The source lines S are formed on the first insulating film 11. Also, drain electrodes and source electrodes of the switching elements, etc., are formed on the first insulating film 11. In the example shown in the figure, the source lines S extend parallel to the common electrode COME in a second direction Y.

The second insulating film 12 is provided on the source lines S and the first insulating film 11. The common electrode COME is formed on the second insulating film 12. In the example shown in the figure, the common electrode COME comprises a plurality of segments. The segments of the common electrode COME extend in the second direction Y, and spaced from each other in a first direction X. Such a common electrode COME is formed of a transparent conductive material such as indium tin oxide (ITO) or indium zinc oxide (IZO). It should be noted that in the example shown in the figure, although metal layers ML are formed on the common electrode COME to reduce the resistance of the common electrode COME, they may be omitted.

The third insulating film 13 is provided on the common electrode COME, the metal layers ML and the second insulating film 12. The pixel electrodes PE are formed above the third insulating film 13. Also, each of the pixel electrodes PE is located between associated adjacent two of the source lines S and opposite to the common electrode COME. Furthermore, the pixel electrodes PE include slits SL located opposite to the common electrode COME. Such pixel electrodes PE are formed of transparent conductive material such as ITO or IZO. The first alignment film AL1 covers the pixel electrodes PE and the third insulating film 13.

On the other hand, the second substrate SUB2 is formed of a second insulating substrate 20 having a light transmission characteristic, such as a glass substrate or a resin substrate. On a side of the second insulating film 20 which is located to face the first substrate SUB1, the second substrate SUB2 comprises black matrixes BM, color filters CFR, CFG and CFB, an overcoat layer OC, a second alignment film AL2, etc.

The black matrixes BM are formed on an inner surface of the second insulating film 20 (on the side thereof which faces the first substrate SUB1), and partition pixels. Color filters CFR, CFG and CFB are also formed on the inner surface of the second insulating film 20 (on the side thereof which faces the first substrate SUB1), and partially stacked on the black matrixes BM. For example, the color filters CFR are red filters; the color filters CFG are green filters; and the color filters CFB are blue filters. The overcoat layer OC covers the color filters CFR, CFG and CFB. Also, the overcoat layer OC is formed of transparent resin material. The second alignment film AL2 covers the overcoat layer OC.

A detection electrode DETE is formed on an outer surface of the second insulating film 20 (on the opposite side of the above side facing the first substrate SUB1). Although the detection electrode DETE includes detection electrodes arranged in the manner of stripes, it is simply shown. Also, a detailed figure of lead lines is omitted. The detection electrode DETE is formed of transparent conducive material such as ITO or IZO.

The backlight BLT is provided on a rear surface side of the display panel PNL. As the backlight BLT, various types of backlights can be applied, and for example, a backlight employing a light emitting diode (LED) or a cold-cathode fluorescent lamp (CCFL) as a light source can be applied. A detailed explanation of the structure of the backlight BLT will be omitted.

The first optical element OD1 is provided between the first insulating substrate 10 and the backlight BLT. The second optical element OD2 is provided above or on the detection electrode DETE (on the opposite side of the above side facing the first substrate SUB1). Each of the first optical element OD1 and the second optical element OD2 includes at least a polarizing plate, and may include a retardation plate as occasion demands.

Next, a touch sensor applied to the display device provided with the sensor according to the embodiment will be explained. As a method of detecting that the user's finger or a pen touches the touch panel or is close to the touch panel, a principle of a self-detection method and a mutual detection method will be explained.

[Self-Detection Method]

FIGS. 3A, 3B, 4A and 4B are views for explaining a principle of a self-detection method of the display device DSP provided with the sensor according to the embodiment.

FIGS. 3A and 3B show that the touch panel is not touched by the user's finger. FIG. 3A shows that due to switching of a control switch SWc, a power supply Vdd and the detection electrode DETE are connected to each other, and the detection electrode DETE is not connected to a capacitor Ccr. In this state, the detection electrode DETE, which has a capacitance Cx1, is charged. FIG. 3B shows that due to switching of the control switch SWc, the power supply Vdd and the detection electrode DETE are disconnected from each other, and the detection electrode DETE and the capacitor Ccr are connected to each other. In this state, the detection electrode DETE having the capacitance Cx1 is discharged through the capacitor Ccr.

FIGS. 4A and 4B show that the touch panel is touched by the user's finger. FIG. 4A shows that due to switching of the control switch SWc, the power supply Vdd and the detection electrode DETE are connected to each other, and the detection electrode DETE is not connected to the capacitor Ccr. In this state, when the user's finger is located to close to the detection electrode DETE to thus have a capacitance Cx2, not only the detection electrode DETE having the capacitance Cx1, but the user's finger having the capacitance Cx2 is charged. FIG. 4B shows that due to switching of the control switch SWc, the power supply Vdd and the detection electrode DETE are disconnected from each other, and also the detection electrode DETE and the capacitor Ccr are connected to each other. In this state, the detection electrode having the capacitance Cx1 and the finger having the capacitance Cx2 are both discharged through the capacitor Ccr.

It should be noted that due to the presence of the capacitance Cx2, a voltage variation characteristic of the capacitor Ccr at the time of discharge as shown in FIG. 4B (in the case where the finger touches the panel) clearly differs from that of the capacitor Ccr at the time of discharge as shown in FIG. 3B (in the case where the finger does not touch the panel). Therefore, in the self-detection method, based on variation of the voltage variation characteristic of the capacitor Ccr which occurs in accordance with the presence or absence of the capacitance Cx2, it is determined whether an input operation of the finger or the like is performed or not.

FIG. 5 is a view showing an example of a basic circuit which achieves the self-detection method in the display device DSP provided with the sensor according to the embodiment.

The detection electrode DETE is connected to one of terminals of a capacitor Cr for voltage division and one of input terminals of the comparator COMP. The detection electrode DETE has a self-capacitance Cx. For example, the detection electrode DETE having the self-capacitance Cx is supplied with a self-sensing pulse (SSP) from a touch IC (TP-IC) through a self-sensing pulse terminal TSSP of the display device DSP provided with the sensor. In the embodiment, for example, on/off signals of switches SW2 and SW3 are self-sensing pulses (SSPs). The other input terminal of the comparator COMP is connected to a supply terminal for a comparison voltage Vref.

In order to simplify an explanation, capacitor and capacitance will be provided with same reference numeral. For example, the detection electrode DETE will be referred to as a capacitor Cx having a capacitance Cx.

The other terminal of the capacitor Cr is connected to a power supply line of a voltage Vcc through a switch SW1, and also connected to one of terminals of a capacitor Cc through a resistor Rc. The other terminal of the capacitor Cc is connected to a reference potential (e.g., a ground potential).

The switch SW2 is connected to the reference potential and the above other terminal of the capacitor Cr, and the switch SW3 is connected between the reference potential and the above one of the terminals of the capacitor Cr. The switches SW1, SW2 and SW3 and the comparator COMP are provided in the control circuit.

Next, an operation will be explained. The switch SW1 is closed (i.e., caused to be in the on state) at regular intervals to enable the capacitor Cc to be charged. At the time of charging the capacitor Cc, the switches SW2 and SW3 are opened (i.e., caused to be in the off state). When the capacitor Cc has been charged, the switches SW1, SW2 and SW3 are all opened (caused to be in the off state) to cause charge in the capacitor Cc to be held therein.

Then, the switches SW2 and SW3 are kept closed (in the on state) for a given time period (whereas the switch SW1 is kept open (in the off state)). As a result, the capacitors Cr and Cx are almost completely discharged, and the capacitor Cc is partially discharged through the resistor Rc.

Subsequently, the switches SW1, SW2 and SW3 are all opened (to be in the off state). As a result, charge in the capacitor Cc moved to the capacitors Cr and Cx. In the comparator COMP, a voltage Vx of the capacitor Cx is compared with a comparison voltage (or a threshold voltage) Vref.

FIG. 6 is a view showing an equivalent circuit in the case where the switches SW1, SW2 and SW3 in the display device DSP provided with the sensor according to the embodiment are closed and opened.

As shown in FIG. 6 showing the equivalent circuit, when the switches SW1, SW2 and SW3 are all turned off, charge in the capacitor Cc moves to the capacitors Cr and Cx, and then variation of the voltage Vx of the capacitor Cx is repeatedly compared with the comparison voltage Vref in the comparator COMP.

To be more specific, the following operation is repeatedly performed.

The switches SW2 and SW3 are kept on for a given time period (whereas the switch SW1 is kept off). As a result, the capacitors Cr and Cx are almost completely discharged, and the capacitor Cc is partially discharged thorough the resistor Rc in accordance with time constants of the capacitor Cc and the resistor Rc. Then, the switches SW1, SW2 and SW3 are all turned off. Consequently, charge in the capacitor Cc moves to the capacitors Cr and Cx.

A relationship between the voltages Vr, Vc and Vx and the capacitances Cr, Cc and Cx is expressed by the following equations (1)-(3):

$$Vc = Vr + Vx \quad (1)$$

$$Vr : Vx = (1/Cr) : (1/Cx) \quad (2)$$

$$Vx = (Cr/(Cr+Cx)) \times Vc \quad (3)$$

As described above, after the capacitor Cc is charged to the voltage Vc through the switch SW1, when the switches SW1 and SW2 are repeatedly closed and opened, the voltage Vc of the capacitor Cc is gradually reduced, and the voltage Vx of the capacitor Cx is also reduced. This operation, i.e., an operation in which after the capacitor Cc is charged to the voltage Vc, the switches SW2 and SW3 are repeatedly closed and opened, is continuously performed until the voltage Vx is decreased to be less than the threshold voltage Vref.

FIG. 7 is a view showing variation waveforms of the voltage Vc of the capacitor Cc and the voltage Vx of the capacitor Cx in the display device DSP provided with the sensor according to the embodiment, the waveforms being obtained when the finger is close to and far from the detection electrode respectively. A horizontal axis and a vertical axis of a coordinate system as shown in FIG. 7 indicate time and voltage, respectively.

When the switch SW1 is closed (turned on), the capacitor Cc is charged in accordance with time constants of the capacitor Cc and the resistor Rc until the voltage Vc of the capacitor Cc reaches the voltage Vcc. Thereafter, the switches SW1, SW2 and SW3 are all opened (turned off), and charge in the capacitor Cc moves to the capacitor Cr and Cx. Then, the voltage Vx of the capacitor Cx is compared with the comparison voltage Vref in the comparator COMP. If the voltage Vx of the capacitor Cx is greater than the comparison voltage Vref, the switches SW2 and SW3 are turned on; and then after the elapse of a predetermined time, the switches SW2 and SW3 are turned off, and the voltage Vx of the capacitor Cx is compared with the comparison voltage Vref in the comparator COMP. Those operations are repeated until the voltage Vx of the capacitor Cx becomes smaller than the comparison voltage Vref.

The characteristic of the variation of the voltage Vx or the degree of the variation thereof changes in accordance with the value of the capacitance Cx. That is, the greater the value of the capacitance Cx, the greater the reduction of the voltage Vx of the capacitor Cx when the switches SW2 and SW3 are turned off and as a result charge moves from the capacitor Cc to the capacitors Cr and Cx. Also, the value of the capacitance Cx varies in accordance with the proximity of the user's finger to the detection electrode DETE. The closer the user's finger to the detection electrode DETE, the greater the value of the capacitance Cx.

Therefore, as shown in FIG. 7, when the user's finger is far from the detection electrode DETE, the voltage Vc slowly varies as indicated by a characteristic VCP1, and when the finger is close to the detection electrode DETE, the voltage rapidly varies as indicated by a characteristic VCP2. When the finger is close to the detection electrode DETE, the rate of reduction of the voltage Vc is great, as compared with that when the finger is far from the detection electrode DETE, since the capacitance of the finger is added to the capacitor Cc.

The comparator COMP compares a voltage Vr with the threshold voltage Vrer in synchronism with repetitive switching between closing and opening of the switches SW2 and SW3. Then, when the voltage Vr is greater than the threshold voltage Vref (Vr>Vref), the comparator COMP generates output pulses. However, the comparator COMP stops output pulses when the voltage Vr becomes less than the threshold voltage Vref (Vr<Vref).

The output pluses of the comparator COMP are monitored by a measurement application or a measurement circuit not shown. That is, after the capacitor Cc is charged once, discharge is repeatedly carried out for short time with the switches SW2 and SW3, and the voltage Vr is repeatedly measured. At this time, a time period (MP1 or MP2) in which on output of the comparator COMP is obtained may be measured, or the number of output pulses of the comparator COMP (the number of pulses which are output from charging of the capacitor Cc until the voltage Vr becomes less than a voltage Vth (Vr<Vth)) may be measured.

When the user's finger is far from the detection electrode DETE, the above time period is long, and when the finger is close to the detection electrode DETE, the time period is short. Also, when the finger is far from the detection electrode DETE, the above number of pulses output from the comparator COMP is large, and when the finger is close to the detection electrode DETE, the number of pulses output from the comparator COMP is small.

Therefore, based on the number of pulses detected, it is possible to determine how close the finger is to the flat surface of the touch panel. Also, detection electrodes included in the detection electrode DETE are arranged in a two-dimensional manner (matrix), and can thus detect a two-dimensional position of the finger on the flat surface of the touch panel.

As described above, it is detected whether or not the finger of the user influences the detection electrode DETE. The time required for the above detection is, e.g., a few hundred of microseconds to the order of a few milliseconds, as described above.

[Mutual Detection Type]

FIG. 8 is a view showing a representative basic structure of a mutual detection type of display device DSP provided with the sensor according to the embodiment. The common electrode COME and the detection electrode DETE are used. The common electrode COME includes a plurality of common electrodes Come1, Come2, Come3, . . . arranged in the manner of stripes. The common electrodes Come1, Come2, Come3, . . . are also arranged in a scanning (driving) direction (a Y direction or an X direction).

The detection electrode DETE includes a plurality of detection electrodes Dete1, Dete2, Dete3, . . . arranged in the manner of stripes (which are thinner than the common electrodes arranged in the manner of stripes). The detection electrodes Dete1, Dete2, Dete3 . . . are also arranged in a direction (the X direction or the Y direction) crossing the common electrodes Come1, Come2, Come3, . . . .

The common electrodes Come1, Come2, Come3, . . . arranged in the manner of stripes in the common electrode COME and detection electrodes Dete1, Dete2, Dete3, . . . arranged in the manner of stripes in the detection electrode DETE are spaced from each other. Thus, basically, capacitors Cc are present between the common electrodes Come1, Come2, Come3, . . . and the detection electrodes Dete1, Dete2, Dete3, . . . .

The common electrodes Come1, Come2, Come3, . . . are scanned by drive pulses Vcom at predetermined intervals. If the user's finger is close to the detection electrode Dete2, when drive pulses are supplied to the common electrode Come2, pulses are obtained from the detection electrode Dete 2, which are lower in level than pulses obtained from the other detection electrodes arranged in the manner of stripes. The detection electrode DETE is used to monitor a fringing field from an electrode COME. To be more specific, when a conductive object such as a finger is brought close to the detection electrode DETE, it intercepts the fringing field. If the fringing field is intercepted, the potential detected by the detection electrode DETE is reduced.

In the mutual detection method, a detection-potential difference made by the above reduction of the potential can be handled as a detection pulse for a position DETP.

The value of the above capacitance Cx varies in accordance with whether the finger is close to or far from the detection electrode DETE. Thus, the levels of the detection pulses also vary in accordance with whether the user's finger is close to or far from the detection electrode DETE. It is therefore possible to determine from the level of the detection pulses how close the finger is to the flat surface of the touch panel. Needless to say, a two-dimensional position of the finger on the flat surface of the touch panel can be detected based on an electrode driving timing of the drive pulses Vcom and an output timing of the detection pulses.

Figure 9:
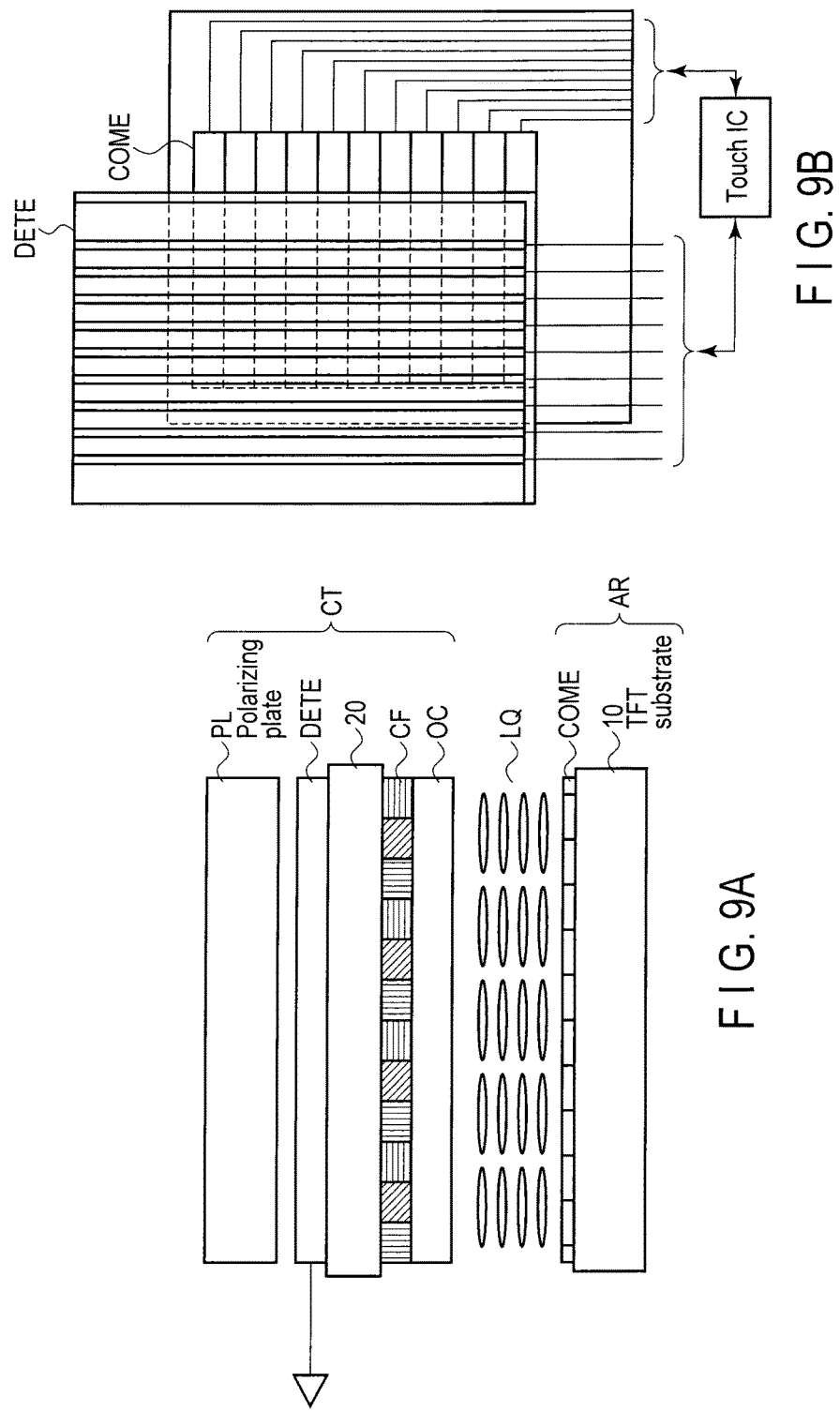
FIG. 9A is a view schematically showing a structure of the display device provided with the sensor, according to the embodiment.
FIG. 9B is another view schematically showing the structure of the display device provided with the sensor, according to the embodiment.

FIGS. 9A and 9B are views schematically showing the structure of the display device DSP provided with the sensor according to the embodiment. FIG. 9A is a cross-sectional view of the display device DSP provided with the sensor, and FIG. 9B is a plan view showing the structure of the sensor.

As shown in FIG. 9A, the display device DSP provided with the sensor comprises an array substrate AR, a counter-substrate CT and the liquid crystal layer LQ held between the array substrate AR and the counter-substrate CT.

The array substrate AR comprises a TFT substrate 10 and the common electrode COME. The TFT substrate 10 comprises a transparent insulating substrate formed of glass or the like, switching elements not shown, various lines including source lines, gate lines, etc., and a flattening layer which is an insulating film covering those lines. The common electrode COME is provided on the TFT substrate 10 and covered by an insulating layer. The common electrodes Come included in the common electrode COME, for example, extend in the first direction, and are arranged in the manner of stripes in the second direction crossing the first direction. The common electrodes Come in the common electrode COME are formed of transparent electrode material such as indium tin oxide (ITO) or indium zinc oxide (IZO). In the embodiment, the common electrodes Come in the common electrode COME are also used as drive electrodes for the sensor.

The counter-substrate CT comprises a transparent insulating substrate 20 such as glass, color filters CF, the detection electrode DETE and a polarizing plate PL. The color filters CF are provided on the transparent insulating substrate 20. The color filters CF are covered by the overcoat layer OC. The detection electrode DETE is provided on a main outer surface of the transparent insulating substrate 20 (which is located opposite to the color filters CF). The detection electrodes Dete included in the detection electrode DETE extend in a direction (second direction) crossing an extending direction (first direction) of the common electrodes, and are arranged in the manner of stripes in the first direction. The detection electrodes DETE are formed of transparent electrode material such as ITO or IZO. The polarizing plate PL is provided above the detection electrode DETE (on a side of the transparent insulating substrate 20 which is located opposite to the color filters CF).

FIG. 9B is a view for explaining a configuration example of the common electrode COME and the detection electrode DETE. In the display device DSP provided with the sensor according to the embodiment, the detection method can be switched between the self-detection method and the mutual detection method. Furthermore, in the self-detection method, the common electrode COME and the detection electrode DETE detect the position of a touch (or proximity) in the second direction and that in the first direction, respectively. Also, in the mutual detection method, drive pulses are input to the common electrode COME, and detection pulses are obtained from the detection electrode DETE.

Figure 10:
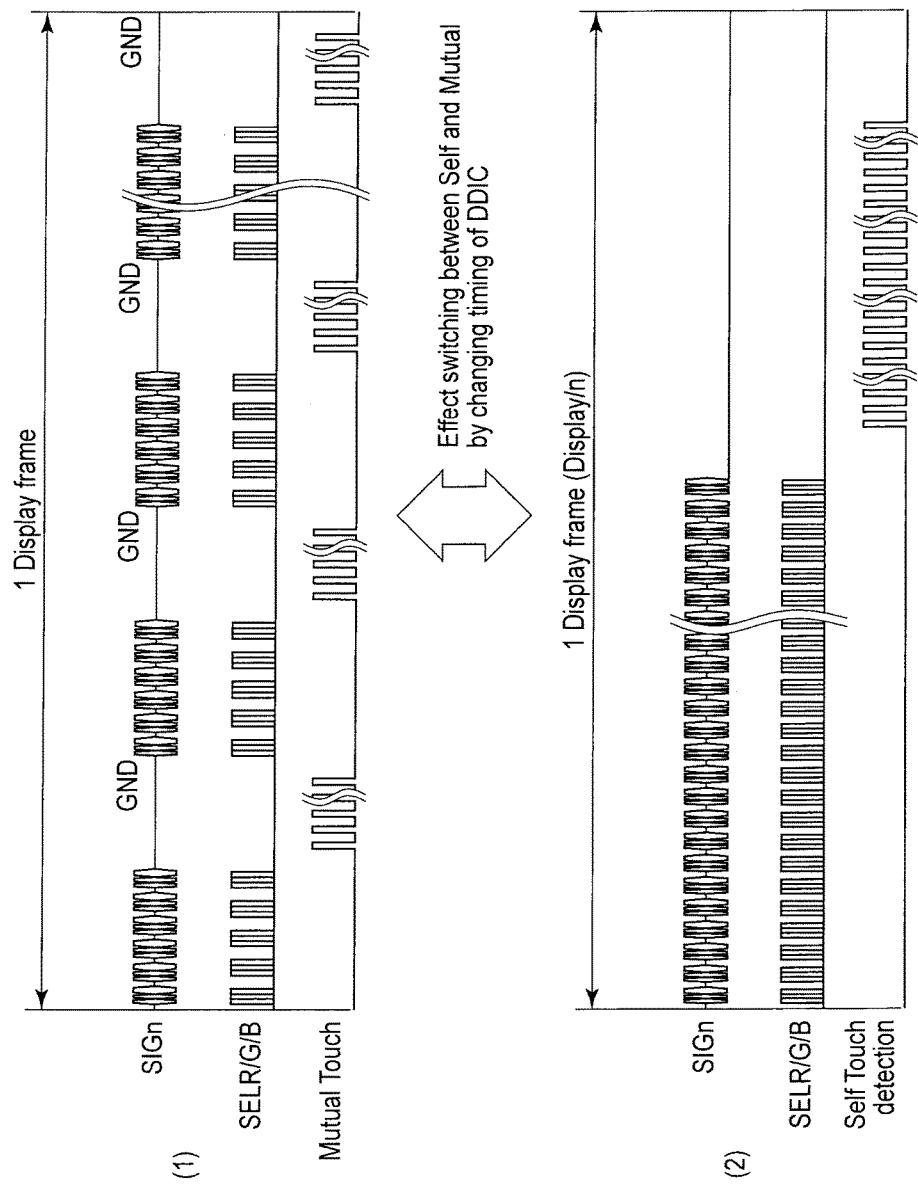
FIG. 10 is a view for explaining driving methods of the self-detection method and the mutual detection method in the display device provided with the sensor, according to the embodiment.

FIG. 10 is a view for explaining driving methods of the self-detection method and the mutual detection method in the display device DSP provided with the sensor according to the embodiment. As described above, since the common electrodes Comes in the common electrode COME, which are used in displaying an image, are also used as electrodes for touch position detection, an image display operation and a touch position detection operation are performed in a time sharing manner.

In the mutual detection method as shown in (1) in FIG. 10, a time period for processing is divided into time periods for displaying an image (hereinafter each referred to as an image display time period) and time periods for detecting a touch position (hereinafter each referred to as a touch position detection time period), and in a single frame time period, image display time periods and touch position detection time periods are alternately applied. To be more specific, an operation for outputting display signals (SIGn) corresponding to respective colors in response to signals (SELR/G/B) for selecting three colors of RGB is performed with respect to a plurality of divided display lines, and thereafter a mutual detection operation in which drive pulses Vcom are input to the common electrodes Come is performed. The divided display lines and the common electrodes Come are successively subjected to the above operations.

In the self-detection method as shown in (2) in FIG. 10, after an image of a single frame is displayed, a self-detection operation is performed by inputting drive pulses to all the common electrodes included in the common electrode COME. To be more specific, an operation for outputting display signals (SIGn) corresponding to respective colors in response to signals (SELR/G/B) for selecting three colors of RGB is performed with respect to all the display lines, and thereafter the self-detection operation is performed by inputting drive pulses to all the common electrodes Come.

It should be noted that in the self-detection method, detection is not dividedly performed, i.e., it is performed at once. This is because the detection sensitivity can be improved by obtaining data on the detection at once. However, in the self-detection method, the detection is not limited to the detection adopting the detection method as shown in (2) in FIG. 10; that is, it may be performed in a division manner as shown in (1) in FIG. 10.

FIG. 11 is a view for explaining a cause of reducing the detection sensitivity of the display device DSP provided with the sensor according to the embodiment.

As shown in FIG. 11, since the common electrode COME is provided close to the source lines S and the gate lines G, parasitic capacitances between the common electrode COME and the source lines S and the gate lines G exit. The parasitic capacitances are very great, and greatly vary because of a film thickness difference, temperature, etc., thus causing a great error, and thus reducing the detection sensitivity. Furthermore, because of the presence of a great parasitic capacitance, it was hard to drive the common electrode COME with a desired waveform having a good responsiveness.

Figure 12:
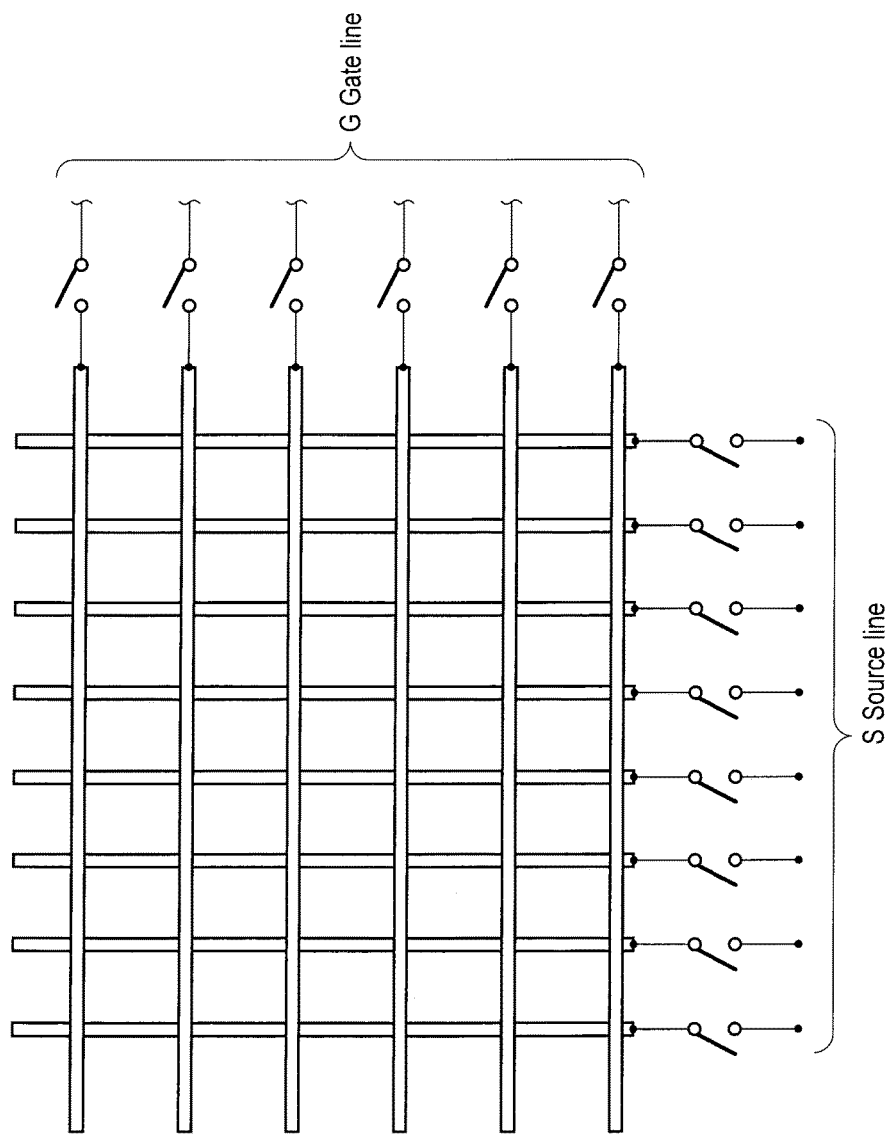
FIG. 12 is a view for explaining a method of reducing an influence of a parasitic capacitance in the display device provided with the sensor according to the embodiment.

FIG. 12 is a view for explaining a method of reducing an influence of a parasitic capacitance in the display device DSP provided with the sensor according to the embodiment.

As shown in FIG. 12, switches for connection with the gate lines G and switches for connection with the source lines S are provided, and during the touch position detection time period, the switches are opened to cause the gate lines G and the source lines S to be in a floating state. As a result, the influence of the parasitic capacitance is completely eliminated in principle, and thus the common electrode COME can be driven with a desired waveform.

Figure 13:
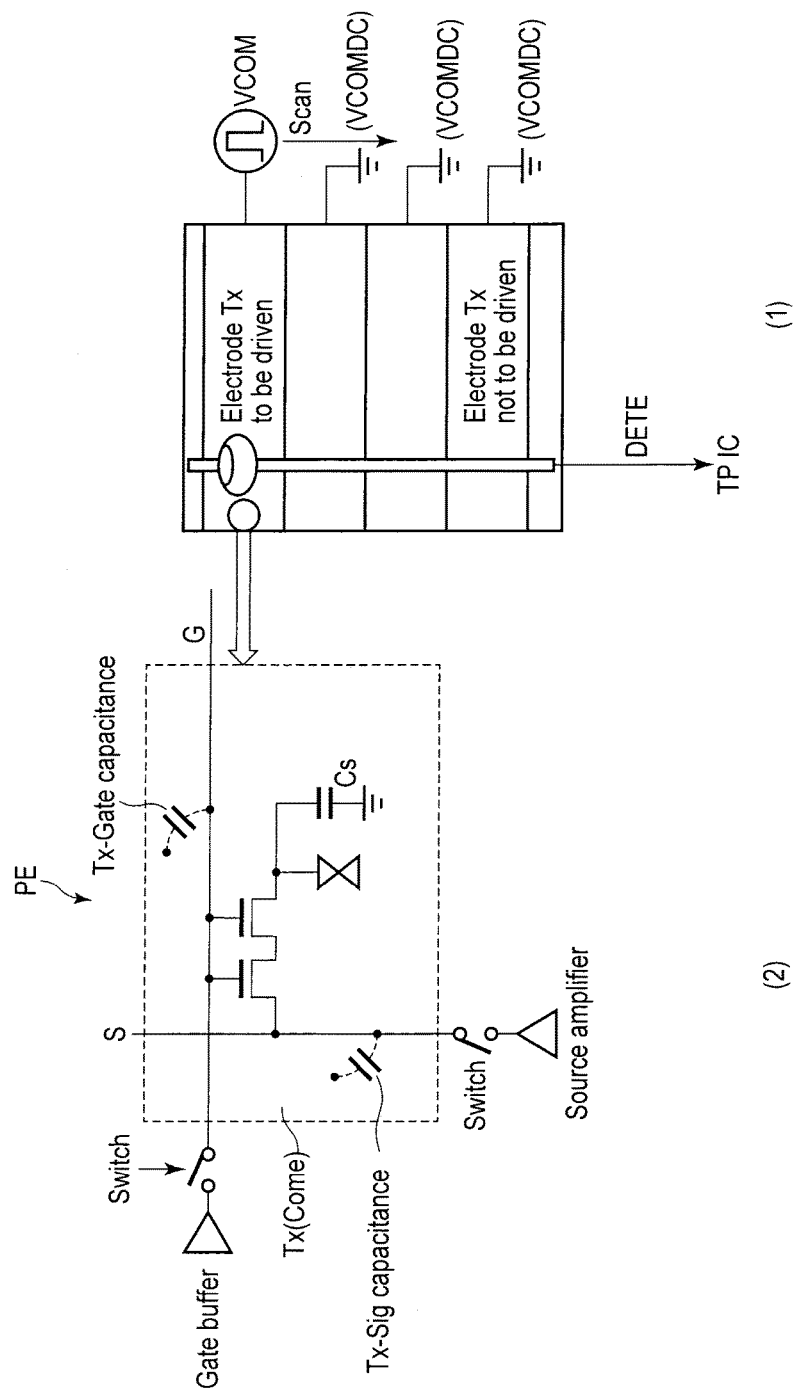
FIG. 13 comprises views for explaining an influence of other parasitic capacitances in the display device provided with the sensor according to the embodiment.

FIG. 13 comprises views for explaining an influence of other parasitic capacitances in the self-detection in the display device DSP provided with the sensor according to the embodiment.

View (1) in FIG. 13 is a view for explaining a drive method of the mutual detection method. As described above, in the common electrode COME including the common electrodes Come arranged in the manner of stripes, driving is performed in units of common electrodes Come. In the following explanation, the common electrodes Come are referred to as drive electrodes Tx. To a drive electrode Tx to be driven, drive pulses Vcom are supplied, and voltages thus generated by detection electrodes Dete ares read by the touch IC (TPIC). In this case, in a conventional drive method, each of drive electrodes Tx not to be driven is connected to a ground potential or a fixed low potential (VCOMDC).

View (2) in FIG. 13 is a view schematically showing a connection between a gate line G, a source line S and a single pixel circuit to be driven. As described above, during the touch position detection period, a switch is opened to cause the gate line G and the source line S to be in a floating state. Although a Tx-Gate capacitance exists between drive electrode Tx and the gate line G, and a Tx-Sig capacitance exists between the drive electrode Tx and the source line S, since the gate line G and the source line S are in the floating state, the influence of the parasitic capacitance can be reduced.

However, in the case where divided common electrodes Comes arranged in the manner of stripes are used as drive electrodes Tx, a drive pulse Vcom is supplied only to a certain drive electrodes Tx to be driven, parasitic capacitances between each of drive electrodes Tx not to be driven and an associated gate line G and an associated source line S have an influence on the detection sensitivity. Therefore, it is also necessary to reduce the influence of the above parasitic capacitances.

In the display device DSP provided with the sensor according to the embodiment, (1) a code division multiplexing (CDM) drive is adopted in which a plurality of drive electrodes Tx are driven at the same time, and (2) a touch drive in which all provided drive electrodes Tx are driven at the same time is performed, thereby to reduce the influence of the above parasitic capacitances.

FIGS. 14A and 14B are views for explaining the CDM drive according to the embodiment.

FIG. 14A shows an example of CDM4 in which a drive operation is performed in units of four successive drive electrodes. In CDM4, drive pulses Vcom are supplied to four drive electrodes Tx at the same time; however, one of the fourth drive electrodes Tx is supplied with a drive pulse Vcom the polarity of which is opposite to that of the drive pulses to the other drive electrodes Tx. The drive pulse Vcom of the opposite polarity is supplied to the four successive drive electrodes Tx in turn, i.e., at times t1, t2, t3 and t4, respectively. After the CDM drive for the four successive drive electrodes Tx is performed, as shown in FIG. 14B, the CDM drive for subsequent four drive electrodes Tx is performed from time t5 to time t8.

FIGS. 15A and 15B are views for explaining advantages of the CDM drive according to the embodiment. They specifically show an example of CDM4 in which the drive operation is performed in units of four successive drive electrodes (in this example, fourth successive drive electrodes Tx1 to Tx4 are shown).

Left part of FIG. 15A shows four drive electrodes (Tx1 to Tx4), and the finger touches part of the surface the position of which corresponds to drive electrode Tx2. Right part of FIG. 15A shows detection voltages generated from a detection electrode Dete corresponding to the part touched by the finger, at drive times (t1, t2, t3 and t4).

The following explanation is given by referring to the detection electrode Dete corresponding to the part touched by the finger.

At time t1, a drive pulse Vcom of the opposite polarity is supplied to drive electrode Tx1 only. Thus, the voltage generated at the detection electrode Dete by drive electrode Tx1 is −1, and the voltage generated at the detection electrode Dete by each of drive electrodes Tx3 and Tx4 is 1. Also, the voltage generated at the detection electrode Dete by drive electrode Tx2 is 0.8, which is smaller than 1, because of the touch by the finger. It should be noted that the percent (sensitivity) of the voltage lowered by the touch by the finger is 20%. As a result, the output of the detection electrode Dete at time t1 is 1.8 (=−1+0.8+1+1).

At time t2, a drive pulse Vcom of the opposite polarity is supplied to drive electrode Tx2 only. Thus, the voltage generated at the detection electrode Dete by drive electrode Tx1 is 1, and the voltage generated at the detection electrode Dete by drive electrodes Tx3 and Tx4 is 1. On the other hand, the voltage generated at the detection electrode Dete by drive electrode Tx2 is −0.8 because of the touch by the finger. As a result, the output of the detection electrode Dete at time t2 is 2.2 (=1−0.8+1+1).

Similarly, the outputs of the detection electrode Dete at times t3 and t4 are both 1.8.

The outputs of the detection electrode Dete obtained at respective times in the above manner are subjected to arithmetic processing by the touch IC (TPIC). FIG. 15B shows an arithmetic processing method of the touch IC (TPIC). A column vector Vx of the left-hand member has as elements the output values of the detection electrode Dete. In a matrix M of the left-hand member, diagonal elements are −1 and other elements are 1. As shown in FIG. 15B, a column vector Vy can be obtained by the matrix-vector product (MVx) of the matrix M and the column vector Vx.

In the case where the drive electrodes Tx are driven one by one, the difference between the value of an output generated at the detection electrode Dete corresponding to the part touched by the finger and that at a detection electrode Dete not corresponding thereto is 0.2 (=1−0.8). In the CDM drive (CDM4), the difference between results obtained by performing an operation on the values of outputs generated by the above detection electrodes Dete is 0.8 (=4−3.2), which is four times greater than the above value in the case where the drive electrodes Tx are driven one by one. Therefore, in the CDM drive, it is possible to obtain a detection value which is four times greater than that in the above case, without increasing a power supply voltage for the drive pulse Vcom, and also possible to improve the signal-to-noise ratio.

Figures 16A, 16B:
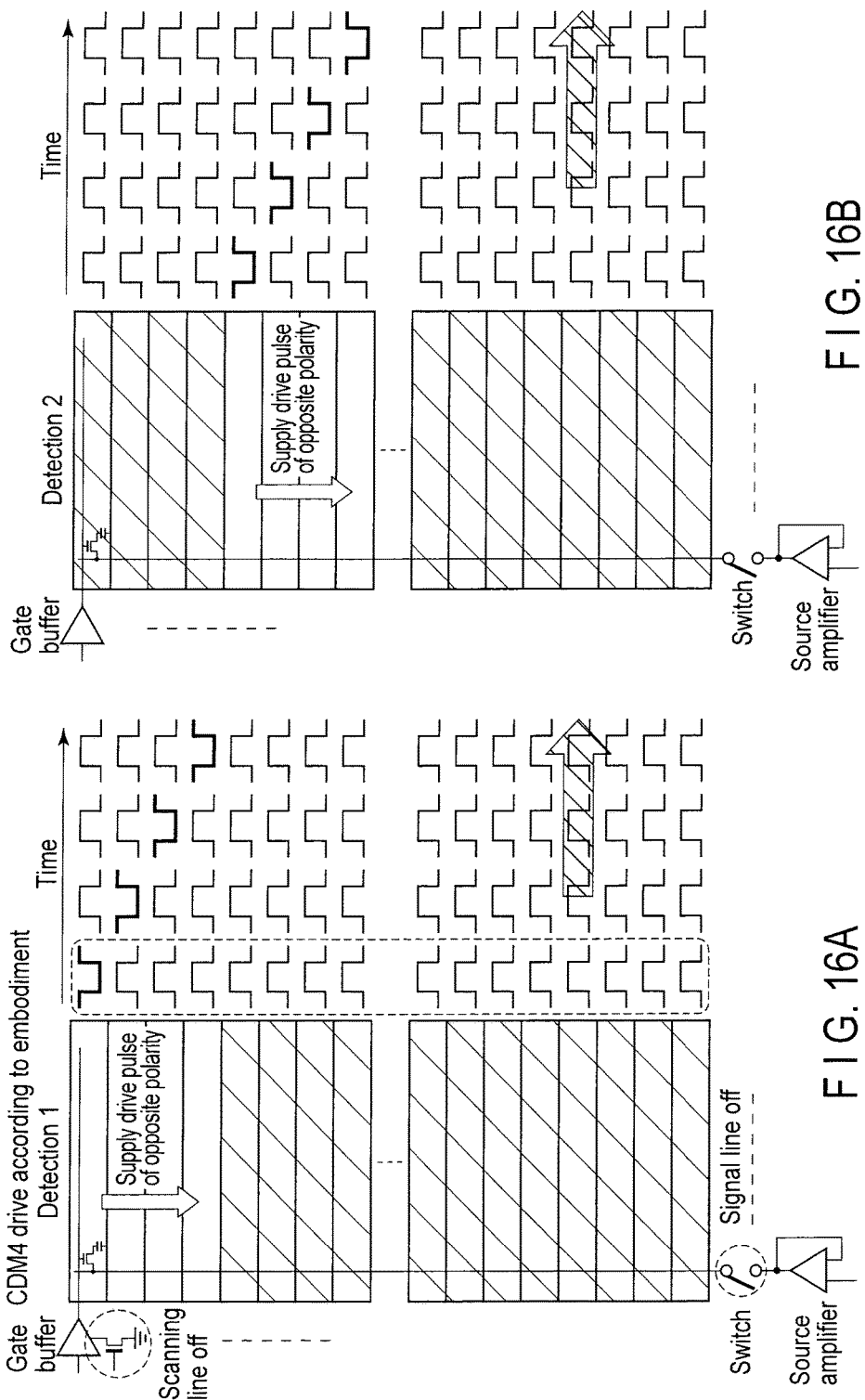
FIG. 16A is a view for explaining a method of driving the display device provided with the sensor according to the embodiment.
FIG. 16B is another view for explaining the method of driving the display device provided with the sensor according to the embodiment.

FIGS. 16A and 16B are views for explaining a method of driving the display device DSP provided with the sensor according to the embodiment.

In this driving method, all the gate lines G and the source lines S are caused to be in the floating state, and also all the drive electrodes Tx are simultaneously supplied with drive pulses Vcom such that only one of the drive electrodes Tx is supplied with a drive pulse Vcom of the opposite polarity. The drive electrodes Tx are successively supplied with the drive pulse Vcom of the opposite polarity at respective times.

FIG. 17 is a view showing a configuration of a touch drive circuit 30 in the display device DSP provided with the sensor according to the embodiment. The touch drive circuit 30 is driven in response to a drive signal output from a display driver (DDI) which is provided in, for example, a control circuit CTR, and controls a display operation and a touch drive operation. The drive signal output from the display driver DDI is supplied as a drive signal VCOM to a drive electrode Tx through the touch drive circuit 30.

The touch drive circuit 30 comprises a shift register circuit 21, a selection circuit 22 and a switching circuit 23. A structure and an operation of the touch drive circuit 30 will be explained by referring to by way of example a single shift register 21a and a single circuit connected thereto.

To the shift register 21a, a transfer start pulse (not shown) and a transfer clock (not shown) are input as transfer circuit control signals. The transfer start pulse is transmitted by the transfer clock in turn to shift registers provided at respective stages. And the transfer start pulse is then output by the transfer clock in turn from the shift registers at the stages.

An output terminal of the shift register 21a is connected to one of input terminals of an exclusive OR (EXOR) circuit 22a included in the selection circuit 22. To the other input terminal of the EXOR circuit 22a, a drive signal VCOM is input. The EXOR circuit 22a outputs 0 if two input signals are at the same logic level, and outputs 1 if the two input signals are at different logic levels.

The drive signal VCOM is a pulse signal of 1 or 0 as described above. Thus, during the time in which the drive signal VCOM is 0 and the output of the shift register 21a is 1, the output of the EXOR circuit 22a is 1, and a touch switch 23a provided in the switching circuit 23 is switched to be in a connected state (on state). As a result, a low-level (L) voltage VCOMDC is applied to drive electrode Tx1.

On the other hand, during the time in which the drive signal VCOM is 1 and the output of the shift register 21a is 1, the output of the EXOR circuit 22a is 0. The output of the EXOR circuit 22a is set to 1 by an inverter 22b included in the selection circuit 22, and a display switch 23b provided in the switching circuit 23 is switched to be in a connected state (on state). As a result, a high-level (H) voltage TSVCOMH is applied to drive electrode Tx1.

Similarly, during the time in which the drive signal VCOM is 1 and the output of the shift register 21a is 0, the output of the EXOR circuit 22a is 1, and the touch switch 23a provided in the switching circuit 23 is switched to be in the connected state (on state). As a result, the low-level (L) voltage VCOMDC is applied to the drive electrode Tx1.

On the other hand, during the time in which the drive signal VCOM is 0 and the output of the shift register 21a is 0, the output of the EXOR circuit 22a is 0. The output of the EXOR circuit 22a is set to 1 by the inverter 22b included in the selection circuit 22, and the display switch 23b provided in the switching circuit 23 is switched in the connected state (on state). As a result, the high-level (H) voltage TSVCOMH is applied to drive electrode Tx1.

Figure 18:
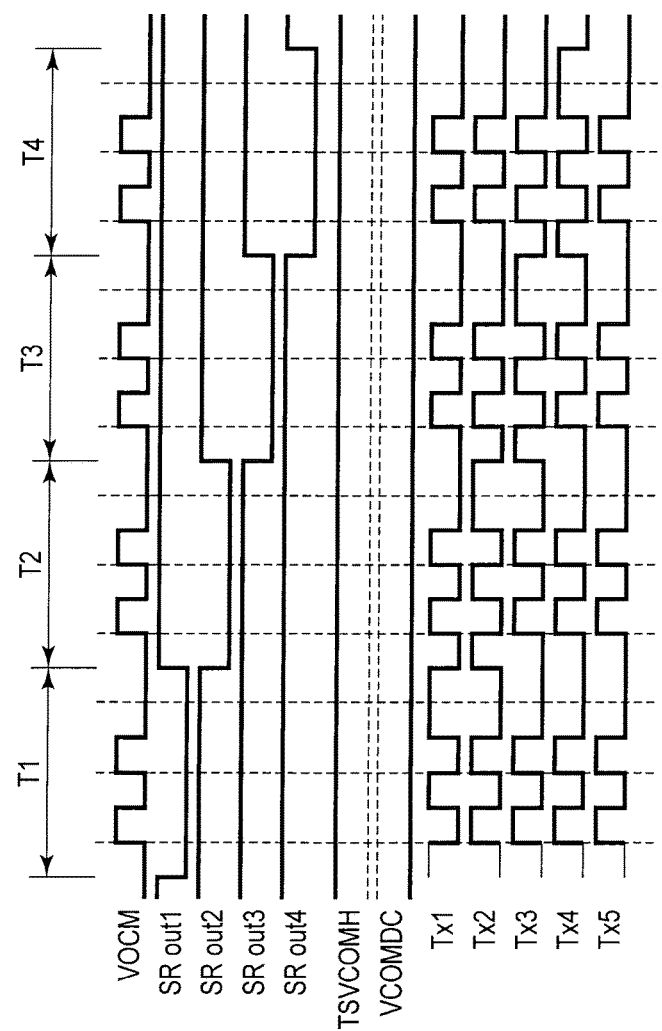
FIG. 18 is a time chart for explaining a touch drive operation of the display device provided with the sensor according to the embodiment.

FIG. 18 is a time chart for explaining a touch drive operation of the display device DSP provided with the sensor according to the embodiment. To be more specific, FIG. 18 shows time shift of the drive signal VCOM, shift-register outputs SRout1 to SRout 4, the high-level voltage TSVCOMH, the low-level voltage VCOMDC, and voltages of the drive electrodes Tx1 to Tx5. It should be noted that in this case, the shift registers provided at the respective stages are successively supplied with a signal having "0" level by respective transfer clocks, and then successively output the signal.

[Operation in First Time Period T1]

In first time period T1, as the drive signal VCOM, two pulse signals are input. In general, as the drive signal VCOM, a larger number of pulse signals are input. However, in the following explanation, in order to simply it, suppose the number of pulse signals is two. In this case, the output of the shift register at the first stage is low (0). Therefore, during time in which the drive signal VCOM is high (1), the output of the EXOR circuit is 1. As a result, to drive electrode Tx1, the low-level (L) voltage VCOMDC is applied. On the other hand, during time in which the drive signal VCOM is low (0), the output of the EXOR circuit is 0. As a result, to drive electrode Tx1, the high-level (H) voltage TSVCOMH is applied. Therefore, a pulse signal the polarity of which is opposite to that of the drive signal VCOM is supplied to drive electrode Tx1.

On the other hand, the outputs of the shift registers at stages other than the first stage are high (1). Therefore, during time in which the drive signal VCOM is high (1), the output of the EXOR circuit is 0. As a result, the high-level (H) voltage TSVCOMH is applied to drive electrodes Tx2 to Tx5. Also, during time in which the drive signal VCOM is low (0), the output of the EXOR circuit is 1. As a result, to drive electrode Tx1, the low-level (L) voltage VCOMDC is applied. Therefore, a pulse signal the polarity of which is the same as that of the drive signal VCOM is supplied to the drive electrodes Tx2 to Tx5.

Similarly, during second time period T2, at timing at which the output of the shift register at the second stage changes to low (0), a pulse signal the polarity of which is opposite to that of the drive signal VCOM is supplied to drive electrode Tx2, and a pulse signal the polarity of which is the same as that of the drive signal VCOM is supplied to drive electrodes Tx1 and Tx3 to Tx5.

Also, during time periods from third time period T3 onward, voltages are applied to the drive electrodes Tx in the same manner as in the first and second time periods.

By virtue of the above circuit structure, it is possible to achieve a desired driving method in which all the drive electrode Tx are simultaneously supplied with drive pulses Vcom, such that only one of the drive electrodes Tx is supplied with a drive pulse Vcom of the opposite polarity, and then the drive electrodes Tx are successively supplied with the drive pulse Vcom of the opposite polarity at respective times.

It should be noted that the above explanation is given with respect to the driving method adopting the CDM4; however, the CDM used in the embodiment is not limited to the CDM4. That is, in the embodiment, it is possible to apply CDMn in which the drive operation is performed in units of n successive drive electrodes.

In the above driving method, all the gate lines G and the source lines S are caused to be in the floating state, and all the drive electrodes Tx are made to have the same polarity, except a single drive electrode Tx; that is, only the single drive electrode Tx is made to have the opposite polarity, and in this state, all the drive electrodes Tx are simultaneously driven, thus reducing the influence of the parasitic capacitances on the detection sensitivity.

Furthermore, since the processing is executed using the CDM drive, the signal-to-noise ratio of the signal can be improved. Therefore, the drive voltage can be reduced, and also the power consumption can be reduced.

All display devices which can be put to practical use by a person with ordinary skill in the art by changing as appropriate the design of the display device according to the embodiment are covered by the disclosure of the present application, as long as they have the subject matter of the invention.

It can be understood that within the scope of the technical concept of the invention, various modifications of the embodiment can be conceived by a person with ordinary skill in the art, and also fall within the scope of disclosure of the present application with respect to the embodiment. For example, with respect to the embodiment, if a person with ordinary skill in the art adds or deletes a structural element or changes a design as appropriate, or adds or omits a step or changes a design, a modification obtained by such a change also falls within the scope of disclosure of the present application with respect to the embodiments described herein, as long as it has the subject matter of the invention.

Furthermore, in addition to the above advantages obtained by the embodiments, if another or other advantages can be obviously considered to be obtained in the embodiments from the specification or can be conceived as appropriate by a person with ordinary sill in the art from the specification, it is understood that such another or other advantages can also be obtained by the embodiments described herein.

It is also possible to make various inventions by combining as appropriate, structural elements as disclosed with respect to the above embodiments. For example, some of the structural elements in the embodiment may be deleted. Also, structural elements used in both embodiments may be combined as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device provided with a sensor, comprising:
   a plurality of electrodes for a touch sensor, which comprise a plurality of drive electrodes arranged side by side to extend in a single direction, and a plurality of detection electrodes extending in a direction crossing the direction in which the drive electrodes extend, and provided to generate capacitances at intersections of the detection electrodes and the drive electrodes; and
   a display panel which includes a plurality of display elements arranged in a matrix, a plurality of gate lines extending along display elements arranged in a row direction, and a plurality of source lines extending along display elements arranged in a column direction,
   wherein a plurality of common electrodes for display which are provided in the display panel are also applied as the drive electrodes in the plurality of electrodes for the touch sensor,
   an image display operation of the display panel and a driving operation of the electrodes for the touch sensor are performed in a time sharing manner,
   in the driving operation of the electrodes for the touch sensor, a code division multiplexing (CDM) drive is performed in units of successive common electrodes, and a drive signal which synchronizes with the CDM drive is input to all common electrodes other than successive common electrodes subjected to the CDM drive, and in the driving operation of the electrodes for the touch sensor, all of the source lines and the gate lines in the display panel are caused to be in a floating state before the CDM drive is performed.

2. The display device provided with the sensor according to claim 1, wherein in the CDM drive, one of the successive common electrodes is supplied with a drive signal whose polarity is opposite to that of drive signals supplied to the others of the successive common electrodes, and the successive common electrodes are successively supplied with the drive signal of the opposite polarity at respective times, and all the common electrodes other than the successive common electrodes are supplied with drive signals whose polarity is the same as that of the others of the successive common electrodes.

3. A method of driving a display device provided with a sensor, which comprises: a plurality of electrodes for a touch sensor, which comprise a plurality of drive electrodes arranged side by side to extend in a single direction, and a plurality of detection electrodes extending in a direction crossing the direction in which the drive electrodes extend, and provided to generate capacitances at intersections of the detection electrodes and the drive electrodes; and a display panel which includes a plurality of display elements arranged in a matrix, a plurality of gate lines extending along display elements arranged in a row direction, and a plurality of source lines extending along display elements arranged in a column direction, the method comprising:

applying a plurality of common electrodes for display which are provided in the display panel, as the drive electrodes in the plurality of electrodes for the touch sensor;

performing an image display operation of the display panel and a driving operation of the electrodes for the touch sensor in a time sharing manner, and performing, in the driving operation of the electrodes for the touch sensor, a code division multiplexing (CDM) drive in units of successive common electrodes, and inputting a drive signal which synchronizes with the CDM drive to all common electrodes other than successive common electrodes subjected to the CDM drive, wherein in the driving operation of the electrodes for the touch sensor, all of the source lines and the gate lines in the display panel are caused to be in a floating state before the CDM drive is performed.

4. The method of driving the display device provided with the sensor, according to claim 3, wherein in the CDM drive, one of the successive common electrodes is supplied with a drive signal whose polarity is opposite to that of drive signals supplied to the others of the successive common electrodes, and the successive common electrodes are successively supplied with the drive signal of the opposite polarity at respective times, and all the common electrodes other than the successive common electrodes are supplied with drive signals whose polarity is the same as that of the others of the successive common electrodes.

* * * * *